UNITED STATES PATENT OFFICE.

WILLIAM G. BROWN, OF NEW ORLEANS, LOUISIANA.

STOCK FOOD.

1,360,174.  Specification of Letters Patent.  Patented Nov. 23, 1920.

No Drawing.  Application filed September 27, 1919. Serial No. 326,728.

*To all whom it may concern:*

Be it known that I, WILLIAM G. BROWN, a citizen of the United States, residing at New Orleans, in the parish of Orleans and State of Louisiana, have invented certain new and useful Improvements in Stock Food, of which the following is a specification.

This invention relates to foods for cattle, horses and other stock, and comprises a novel stock food, and also the method whereby such food may be prepared in a stable and transportable form. My novel stock food contains as essential ingredients the tops of sugar cane, suitably comminuted and deprived of a large proportion of their moisture, and cane molasses, the mixture being preferably compressed into bales or blocks which are sufficiently friable to avoid the formation of hard lumps, and yet sufficiently dense to insure their keeping quality. The method of production of the food is such as to insure its initial sterility, and when properly prepared it may be stored or transported, even in the tropics, without material deterioration by fermentation or from other causes. The stock food may of course have other ingredients than those mentioned: for example it may be reinforced by a material relatively high in protein, such for example as cotton-seed meal, gluten meal or the like. Naturally such additions may be made in the process of manufacture, or at the time of feeding as may be deemed desirable.

It has been proposed heretofore to absorb molasses in dried vegetable fibers, including bagasse, or the fibrous components of bagasse after removal of the pith or even in the pith itself. Such fibrous materials however are practically devoid of food value, and serve merely to absorb the molasses and to give the requisite bulk to the food. In this connection it will be understood that bagasse is the woody matter of the sugar cane after subjection to the processes of pressure and maceration or washing, whereby the sugar-bearing juice and the water-soluble components are largely removed.

The cane-tops, which are cut off and discarded as unfit for sugar-making purposes, are of a totally different character. They comprise the part of the cane in active growth and approximate to some degree the qualities of the rich grasses. As compared with the stalk of the cane, they are poorer in sucrose, richer in glucose and starchy matters as well as in albuminous bodies; and the cellulosic material is much softer and less woody in character. The dried material may be compared to timothy hay, and possesses an aroma and flavor which is probably due to certain amido-bodies and has proven highly palatable and attractive to cattle and horses. In all of these respects it differs radically from bagasse.

I prefer to prepare the stock food as follows: The freshly cut tops (comprising the upper leaves and the immature upper end of the stalk) are passed through any suitable shredding machine, such as a Williams shredder, and are then quickly dried. This operation is preferably carried out in a counter-current drier of the inclined tumbling-drum type in which the material is in direct contact with highly heated products of combustion. The fresh tops contain around 70% of moisture, and I prefer to dry them to a moisture-content not exceeding 10% and preferably between 2 and 5%. This is below the equilibrium point for moisture: that is to say the dried tops would gain weight if exposed at normal temperature to air of average humidity. So long as the evaporation is taking place freely the temperature of the material will remain near the boiling point of water and there will be no danger of scorching or charring, or of caramelizing the sugar. The hot product issuing from the drier is sprayed with molasses, which should preferably contain about 85% total solids, and which may if desired be heated in order to render it more fluid and to increase the penetration. I prefer to apply about 70 parts by weight of molasses to 30 parts of the dried tops, although, considerable variation is permissible in these proportions. At this point I may also add any desired proportion of cotton-seed meal or other material rich in proteid matter. For example, for work horses or mules, I prefer to introduce about 20 pounds of cotton-seed meal for each 80 pounds of the tops-molasses mixture, and this proportion may be increased to 30 pounds for milch cattle. The mixture, whether containing the cotton-seed meal or not, is then charged into a mixer, preferably of the continuous conveyer type, and thoroughly mixed.

The mixture now contains around 12% of moisture and might be baled in this condition. I prefer, however, to pass it through a second drier similar to the first, in which the moisture content is reduced to 6–8%, while at the same time a thorough sterilization is accomplished. The product issuing from the second drier is baled, preferably in a continuous press, the bales of sufficient density to insure stability against fermentation. This work may be satisfactorily done in apparatus of the hay-press type, a wire binder being preferably applied.

One effect of the quick drying in contact with hot products of combustion is to thoroughly sterilize the mass; another is to "set" or coagulate the albuminoid matters; still another is to develop the peculiar aroma of the tops and thereby to render the product highly palatable to stock. Other changes, which have not been traced, unquestionably take place and contribute to the result.

A typical analysis of a mollasses cane-tops food prepared in accordance with my invention and containing no added proteid substance is as follows:

|  | Per cent. |
|---|---|
| Moisture | 7.41 |
| Crude fiber | 21.53 |
| Sugars | 50.26 |
| Non-sugars | 7.80 |
| Protein | 4.53 |
| Fats | 2.22 |
| Ash | 6.25 |

A typical analysis of the dried shredded cane-tops is as follows:

|  | Per cent. |
|---|---|
| Fiber | 68.98 |
| Sugars | 14.01 |
| Non-sugars | 6.36 |
| Protein | 6.63 |
| Ash | 4.02 |

The high fiber content of the tops is advantageous not only as contributing to the bulk necessary for a stock food, but as being highly digestible.

I claim:—

1. A chemically stable stock-food containing comminuted tops of sugar cane, deprived of the bulk of their moisture, and impregnated with cane molasses.

2. A chemically stable stock-food containing comminuted tops of sugar cane, deprived of the bulk of their moisture, impregnated with cane molasses, and mixed with a proteid substance.

3. A chemically stable stock-food containing less than 10% of moisture, and comprising comminuted cane-tops and molasses.

4. A chemically stable stock-food containing less than 10% of moisture, and comprising comminuted cane-tops, molasses, and a proteid substance.

5. Method of preparing a chemically stable stock-food, comprising shredding and drying cane-tops, impregnating the dried material with molasses, drying the mixture, and baling the same to a sufficient density to insure stability against fermentation.

In testimony whereof, I affix my signature.

WILLIAM G. BROWN.